2,863,909

PROCESS OF EXTRACTING 1,4-DICAFFEYL-QUINIC ACID

Luigi Panizzi, Maria Luisa Scarpati, and Giovanna Oriente, Rome, Italy, assignors to Società Farmaceutici Italia, a corporation of Italy No Drawing. Application September 4, 1957
Serial No. 681,895

Claims priority, application Italy May 28, 1954

9 Claims. (Cl. 260—473)

The present invention, which is a continuation-in-part of application Serial No. 510,872, filed May 24, 1955, now abandoned, relates to a process of extracting and separating pure 1,4-dicaffeylquinic acid. Furthermore, it relates to this new substance which exhibits pronounced physiological activity, particularly as a stimulant of biliary secretion and cholesterol metabolism.

We have found that 1,4-dicaffeylquinic acid can be obtained in the pure state by means of extraction from various plants in which it is contained, namely from cardoon (*Cynara cardunculus*) and artichoke (*Cynara scolymus*), *Onopordon illyricum, Scolymus hispanicus* and *Lupsia galactites*. While these plants belong to the genus Cynara, family of Compositae, sub-family of Tubiflorales, we found that *Foeniculum vulgare* and *Foeniculum piperitum* of the genus Foeniculum, family of Umbelliflorae, also represent excellent source material for the extraction of 1,4-dicaffeylquinic acid.

The extraction process which is the object of the present invention is based on the precipitation resulting from the addition of barium or lead salts to the decoction liquor obtained upon boiling the fresh plants with water and filtering or decanting the fluid pulp. Adding one of these salts to the cold or hot decoction liquor produces a greenish-yellow precipitate, which is separated by centrifugation or filtration. This precipitate contains 1,4-dicaffeylquinic acid in the form of barium or lead salt together with large amounts of other extraneous matter. The extraction of pure 1,4-dicaffeylquinic acid from this precipitate is substantially based on one of the following three methods, depending upon which of the metals, barium or lead, has been used in the process. Each of the methods comprises the selective separation of the active substance from extraneous matter by means of said agents.

Method (1) comprises fractionally eluting the lead precipitate with 30–50% diluted acetic acid at a temperature of 50 to 80° C., while vigorously stirring. After cooling, most of the lead salts and all of the extraneous matter remaining undissolved under these particular conditions are separated by filtration or centrifugation. The resulting solution, which contains all of the active substance and part of the lead, is treated with sulfuric acid and hydrogen sulfide in order to completely remove the lead, and is then concentrated until crystallization of the active substance takes place.

Method (2) comprises completely dissolving the barium or lead complex by adding a very slight excess of 10% nitric acid. Only the active substance crystallizes out while all other materials remain in solution.

Method (3) comprises dissolving foreign matter which accompanies the barium or lead complex, by using a slight excess of dilute sulfuric acid. The active substance mixed with lead or barium sulfate is separated from the solution and is isolated from these sulfates by extracting with an organic solvent, such as alcohols and ethers (for example, methanol, ethanol or dioxane), in which these sulfates are insoluble and the 1,4-dicaffeylquinic acid is soluble.

Method (1) is particularly suitable for processing the lead complex, whereas methods (2) and (3) are better adapted for processing the barium complex.

The crude 1,4-dicaffeylquinic acid obtained by the afore-described methods is further purified by crystallization from dilute acetic acid or aqueous solution.

As previously stated, 1,4-dicaffeylquinic acid can be obtained from several plants, particularly from their leaves; but cardoon (*Cynara cardunculus*) is preferable as raw material for the extraction because it contains the active substance in larger amounts. The extraction procedures are the same in all cases.

In the pure state, 1,4-dicaffeylquinic acid has the shape of microscopic, acicular white scales melting with decomposition at 227–228° C. upon rapid heating and having a rotatory index of $(\alpha)_D = -68° \pm 1°$ (c.=2.0, ethanol). Its flavor is slightly sweet. It is easily soluble in pyridine and in anhydrous ethanol, less soluble in acetic acid and scarcely soluble in water (0.06% in the cold) and in the common organic solvents. The substance is of slightly acid nature and is soluble in dilute alkaline carbonates and bicarbonates. The aqueous solution turns green upon the addition of ferric chloride and gives a yellow precipitate with neutral lead acetate and with barium hydroxide.

The following empirical formula has been established for the new substance:

$$C_{25}H_{19}O_{12} \cdot H_2O$$

as well as the structure which is that of 1,4-dicaffeylquinic acid:

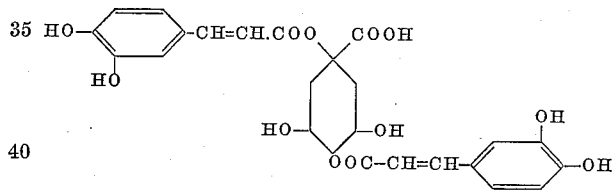

Upon exhaustive acetylation, the product yields a hexa-acetyl derivative having a M. P. of 170–172° C. Catalytic hydrogenation changes the substance to a tetrahydro-derivative (M. P. 136–138° C., decomposition). As a result of alkaline fusion, the substance yields 3,4-dioxybenzoic acid. Upon saponification of the substance or its dihydro-derivative, 3,4-dioxycinnamic acid and 3,4-dioxy-β-phenyl-propionic acid, respectively, are obtained, together with quinic acid (M. P. 160–162° C.), in a molar ratio of 2:1. By means of methylation, 1,4-di-(3',4'-dimethoxy-cinnamoyl)quinic acid methyl ester is obtained in the form of fluffy needles (M. P. 160° C.), which prove to be inert to periodic acid.

One could presume, from the foregoing, that the new substance consists of the 1,4- or 4,5-diester of 3,4-dioxycinnamic acid with quinic acid. However, since the condensation product between two mols of dicarbomethoxy-caffeic-acid chloride and 1-carbomethoxyquinide (M. P. 131–133° C.) fails to yield the natural product after selective saponification with barium hydroxide, it must be concluded that the latter has the structure of 1,4-dicaffeylquinic acid.

In order to illustrate, but without intention of restricting the invention thereto, several examples of the extraction of 1,4-dicaffeylquinic acid from artichoke and cardoon leaves are presented.

Example 1

Fresh cardoon (*Cynara cardunculus*) leaves are boiled for six to eight hours with four to five times their weight of water. The hot, clear decoction liquor is treated with an excess of neutral lead acetate. A greenish-yellow precipitate forms, which is filtered off or removed by centrifuging. The moist precipitate is suspended in 0.37 part of water and treated with 0.62 part of 40% acetic acid at a temperature from 60 to 80° C., while vigorously stirring. After cooling to room temperature, a substantial, undissolved portion is separated by filtration or centrifugation and is discarded. Nearly all the lead contained in the clear liquid is precipitated by adding 0.2 part by volume of diluted sulfuric acid (1:3). After filtering off of the lead sulfate, the small amount of lead still remaining in solution is precipitated with hydrogen sulfide. The precipitate is filtered off and the filtrate is concentrated until crystallization of 1,4-dicaffeylquinic acid, which is purified by recrystallization from water or from dilute acetic acid.

Example 2

Fresh artichoke (*Cynara scolymus*) leaves are boiled for six to eight hours with four to five times their weight of water. After filtration, the decoction liquor is concentrated in vacuo to one third of its volume. After cooling, the liquid is neutralized with NaOH and, thereupon, a slight excess is added, first of a concentrated barium nitrate solution and then, while working in a nitrogen atmosphere, of a barium hydroxide solution. The resulting yellow mass is centrifuged and the solid portion separated thereby is treated with a slight excess of 10% sulfuric acid. After standing, the mixture is filtered, the solid portion washed with water, and the 1,4-dicaffeylquinic acid container therein extracted with alcohol.

Example 3

The yellow mass obtained upon treating the decoction of cardoon or artichoke leaves with barium hydroxide, as described in Example 2, is dissolved by adding an amount of 10% nitric acid sufficient to obtain a solution having a pH of about 1. After standing for an extended period of time, 1,4-dicaffeylquinic acid crystallizes from the solution and is collected by filtration.

Example 4

The greenish-yellow mass obtained by treating the decoction of cardoon or artichoke leaves with an excess of lead acetate, as described in Example 1, is treated with a slight excess of 1:2 sulfuric acid (pH of the mixture being about 1). After standing, the solid portion is filtered off and washed with water. The filter cake is extracted repeatedly with ethanol and the ethanolic solution is evaporated to dryness. 1,4-dicaffeylquinic acid thus obtained is purified by dissolving in 10% sodium carbonate and reprecipitating with dilute acids.

Example 5

2 kg. of *Foeniculum piperitum* (aereal parts of the fresh plant) are boiled with 10 liters of water for six hours. The decoction liquor is cooled, filtered and treated with about 100 cc. of a saturated solution of neutral lead acetate. The precipitated lead salts are centrifuged, washed and suspended in 100 cc. of 40% acetic acid diluted with 100 cc. of water. The suspension is boiled, filtered warm on a Büchner funnel to remove undissolved matter and washed with boiling water. The filtrate is freed from lead by means of hydrogen sulfide. Lead sulfide is filtered off on a Büchner funnel, washed with boiling water, and the filtrate is concentrated to about 40 cc. under vacuum.

After standing, a white precipitate is separated and dried; it weighs 3 g. Upon crystallization from water, 0.2 g. of 1,4-dicaffeylquinic acid are obtained, M. P. 227–228° C. (quick heating), specific rotatory power $(\alpha)_D = -68° \pm 1°$ (c.=2.0, ethanol).

We claim:
1. The process for obtaining 1,4-dicaffeylquinic acid from plants taken from the group consisting of *Cynara cardunculus, Cynara scolymus, Onopordon illyricum, Scolymus hispanicus, Lupsia galactites, Foeniculum vulgare* and *Foeniculum piperitum*, which comprises treating a decoction liquor obtained from one of said plants containing said 1,4-dicaffeylquinic acid with an excess of a salt taken from the group consisting of aqueously soluble barium and lead salts, and separating said 1,4-dicaffeylquinic acid from the resulting voluminous precipitate by adding an acid taken from the group of acids consisting of sulfuric, nitric and acetic acids.

2. The process for obtaining 1,4-dicaffeylquinic acid from plants taken from the group consisting of *Cynara cardunculus, Cynara scolymus, Onopordon illyricum, Scolymus hispanicus, Lupsia galactites, Foeniculum vulgare* and *Foeniculum piperitum*, which comprises boiling fresh leaves of said plants for several hours in water, separating clear decoction liquor, treating said decoction liquor with an excess of a compound taken from the group consisting of aqueously soluble barium and lead compounds, separating the resulting voluminous precipitate, acidifying the moist precipitate with an acid taken from the group of acids consisting of sulfuric, nitric and acetic acids, removing undissolved matter, and purifying 1,4-dicaffeylquinic acid by fractional crystallization after recovery from the remaining solution.

3. The process according to claim 2, wherein said decoction liquor is treated, at room temperature, first with barium nitrate and then with barium hydroxide.

4. The process according to claim 2, wherein said decoction liquor is treated, at 50 to 80° C., with neutral lead acetate.

5. The process for obtaining 1,4-dicaffeylquinic acid from plants taken from the group consisting of *Cynara cardunculus, Cynara scolymus, Onopordon illyricum, Scolymus hispanicus, Lupsia galactites, Foeniculum vulgare* and *Foeniculum piperitum*, which comprises boiling fresh leaves of said plants for several hours in water, separating clear decoction liquor, treating said decoction liquor at 50 to 80° C. with an excess of neutral lead acetate, separating the resulting voluminous precipitate, suspending it in water, treating the suspension with dilute acetic acid at 60 to 80° C., removing undissolved matter, and recovering 1,4-dicaffeylquinic acid from the remaining solution.

6. The process according to claim 5, which comprises adding dilute sulfuric acid to said remaining solution, removing resulting precipitate, adding hydrogen sulfide, filtering and concentrating the filtrate until 1,4-dicaffeylquinic acid crystallizes.

7. The process for obtaining 1,4-dicaffeylquinic acid from plants taken from the group consisting of *Cynara cardunculus, Cynara scolymus, Onopordon illyricum, Scolymus hispanicus, Lupsia galactites, Foeniculum vulgare* and *Foeniculum piperitum*, which comprises boiling fresh leaves of said plants for several hours in water, separating clear decoction liquor, treating said decoction liquor with an excess of a compound taken from the group consisting of aqueously soluble barium and lead compounds, separating the resulting voluminous precipitate, adding to the moist precipitate an amount of 10% nitric acid to obtain a solution having a pH of about 1, and recovering 1,4-dicaffeylquinic acid from the solution after standing.

8. The process for obtaining 1,4-dicaffeylquinic acid from plants taken from the group consisting of *Cynara cardunculus, Cynara scolymus, Onopordon illyricum, Scolymus hispanicus, Lupsia galactites, Foeniculum vulgare* and *Foeniculum piperitum*, which comprises boiling fresh leaves of said plants for several hours in water, separating clear decoction liquor, treating said decoction liquor with an excess of a compound taken from the group consisting of aqueously soluble barium and lead compounds, separating the resulting voluminous precipitate, adding to the moist precipitate a slight excess of dilute sulfuric acid, separating the solids after standing and recovering 1,4-dicaffeylquinic acid from the solids.

9. The process according to claim 8, wherein the solids separated after standing are washed with water, extracted with a solvent taken from the group of solvents consisting of methanol, ethanol and dioxane, the solvent extract is evaporated to dryness and pure 1,4-dicaffeylquinic acid is recovered by dissolving the residue in about 10% sodium carbonate and reprecipitating with a dilute acid.

No references cited.